United States Patent [19]

Chand et al.

[11] Patent Number: 4,663,726

[45] Date of Patent: May 5, 1987

[54] ROBOT CONTROL UTILIZING CUBIC SPLINE INTERPOLATION

[75] Inventors: Sujeet Chand, Charlottesville; Jack B. Amis, Ruckersville, both of Va.; William Cartwright, Sorrento, Fla.; Ahmad Sadre, Whitefish Bay, Wis.; Robert M. Kossey, Belmar, N.J.

[73] Assignee: General Electric Co., Charlottesville, Va.

[21] Appl. No.: 723,379

[22] Filed: Apr. 15, 1985

[51] Int. Cl.[4] .............................................. G06F 15/46
[52] U.S. Cl. .................................... 364/513; 318/573; 364/169; 414/730; 901/2; 901/9; 901/30
[58] Field of Search ........................ 364/513, 167–171, 364/191–193, 474; 318/568, 573; 901/2–6, 9, 30, 31, 32; 414/730

[56] References Cited

U.S. PATENT DOCUMENTS 4,258,425 3/1981 Ramsey et al. ...................... 364/513
4,308,584 12/1981 Arai ...................................... 364/513
4,412,293 10/1983 Kelley et al. ......................... 364/513
4,555,758 11/1985 Inaba et al. ....................... 364/513 X
4,578,757 3/1986 Stark ................................ 364/513 X

*Primary Examiner*—Joseph Ruggiero
*Attorney, Agent, or Firm*—Irving M. Freedman

[57] ABSTRACT

An end effector move is executed by transforming the end effector position and orientation into joint coordinates at a large number of points on the end effector trajectory. On-line joint trajectories are determined in real time by looking ahead a few points on the end effector trajectory and generating points along the different joint trajectories. The current point and the look-ahead points are referred to as a block. An initial estimate of the slope at the block end points is made and then improved by overlapping the next block with the current block. The coefficients of the polynomials converting the points in the joint trajectories are interpolated to provide position commands to a servo control associated with the robot joint to control robot joint motion.

7 Claims, 7 Drawing Figures

```
IF final THEN
  time2sqr = SQR(time2)
  time1sqr = SQR(time1)
  temp2 = 1.0/(2 * time1 * time2 * (time1 + time2))
  temp3 = time1 * time2sqr
  FOR i = 1 TO max_joints DO
    vel2(i) =((3 *_(point2.joint_loc(i) - point1.joint_loc(i))) * time2sqr +
    (3*(point3.joint_loc(i) - point2.joint_loc(i)) * time1sqr - vel1(i) *
    temp3))* temp2
  END_FOR
ELSE
  temp2 = 1.0 /(3 * time1)
  FOR i = 1 TO max_joints DO
    vel2(i) =(point3.joint_loc(i)+(2 * point2.joint_loc(i)) -
    (3*point1.joint_loc(i))- vel1(i) * time1)* temp2
  END_FOR
END_IF
FOR i= 1 TO max_joints DO
  coeff(1) = point2.joint_loc(i)
  coeff(2) = -vel2(i) * time1
  coeff(3) = 3*(point1.joint_loc(i) - point2.joint_loc(i)) + (vel1(i) + 2*vel2(i))*time1
  coeff(4) = 2*(point2.joint_loc(i)-point1.joint_loc(i))-(vel1(i)+vel2(i))*time1
  build_acb(motion_acb,time1,false,i,apdata_ptr)
END_FOR
IF final THEN
  send_linear_acb(head_acb,apdata_ptr,ap_stop_received,false)
  FOR i = 1 TO max_joints DO
    coeff(1) = point3.joint_loc(i)
    coeff(2) = 0.0
    coeff(3) = 3*(point2.joint_loc(i) - point3.joint_loc(i)) + (vel2(i) * time2)
    coeff(4) = 2*(point3.joint_loc(i) - point2.joint_loc(i)) - vel2(i) * time2
    build_acb(motion_acb,time2,final,i,apdata_ptr)
  END_FOR
END_IF
```

FIG. 5

```
Begin
    IF state = 'run' THEN

IF (normalized_time = 0H) THEN
        goto end_interpolate;
    END_IF

IF (DIV256 = True) THEN time_offset = xxtt.tt
    IF (DIV256 = False) THEN time_offset = tttt.xx Normalized_time = normalized_time - time_offset;

IF (normalized_time - time_offset < 0) THEN
        normalized_time = 0H;
    END_IF Compute velocity_feedforward;
        velocity_feedforward = ((A3 * u + 2 * (A3 * u + A2)) * u + A1) * du
            where:    Ai = polynomial coefficients
                      u = normalized time
                      du = time_offset Compute commanded position by Horners Method;
        commanded_position = ((A3 * u + A2) * u + A1) * u + A0;

END_IF
```

FIG.6

ROBOT CONTROL UTILIZING CUBIC SPLINE INTERPOLATION

This invention relates to a control for a serial-link articulated robot manipulator with any combination of rotating and sliding joints for providing real time determination of joint trajectories for a continuum of successive joint coordinates.

A smooth and predictable trajectory of all robot joints is of primary importance in most robot tasks. A motion command to a robot is usually specified as a trajectory of its end effector or tool. The trajectory could be a straight line or any curve. Trajectory generation for end effector motion is done at 2 levels. The first or the higher level is determination of desired end effector trajectory. The second or lower level is determination of joint trajectories to carry out the desired end effector trajectory. A robot can be considered to comprise a series of links connected together by joints. The joints are capable of rotational and translational motion. Robot movement is accomplished by controlling joint movement using commands to servo motors driving the joints.

Joint trajectories are determined by transforming a number of points on the end effector trajectory to joint space by a reverse or backward transformation. Transformation algorithms describe the position and orientation of the end effector in terms of the angles and translations between a series of manipulator joints. Joint coordinates are defined with reference to coordinate reference frames embedded in each link of the manipulator. The reverse or backward transformation describes the joint coordinates, given for the description of the end effector trajectory. A joint trajectory will therefore, comprise a large number of intermediate target points spaced on a certain time scale. Successive joint target points, along with velocities and sometimes joint accelerations make up the command to the servos. The servo control is now responsible for moving the joint to its desired position with the given velocity and acceleration. In order to produce smooth and predictable motion of a joint, the joint trajectory generator should provide the servo with a smooth (at least continuous in velocity) and feasible (joint displacement within physical bounds) trajectory. The combination of joint trajectories yields the desired motion of the end effector.

In the simple case of moving the robot end effector in a straight line, the end effector postion and orientation can be interpolated along the straight line to pick up as many intermediate points as desired. For each interpolated point on the straight line trajectory of the end effector, the joint coordinates must be computed, using a reverse transformation on the end effector position and orientation. Two approaches can be used to implement the desired motion: off-line (non real-time) or on-line (real-time).

Using the off-line approach, all joint trajectories are pre-computed and stored. The end effector trajectory is interpolated as frequently as updates to the servos and the successive target positions for each joint are stored. If the robot move is 3 seconds long, then at a typical servo update rate of 2 milliseconds it is necessary to store 9,000 real numbers for a robot with six degrees of freedom. In each real number representation is 32 bits long, then a 3 second precomputed move would require 36K bytes of memory. If pre-move time and memory are of no concern, then off-line trajectory generation is the desirable choice.

The off-line approach, however, is not acceptable for any form of sensor based control, since the robot trajectory is pre-computed and "canned". The pre-computation does not allow for dynamic alteration and therefore cannot respond to sensory information received while in motion.

For on-line implementation, trajectories are computed on the fly or in real-time, and computational complexity of trajectory generation is a major concern. For most manipulators, it is not possible to compute joint target points at the same rate as the update rate in commands to the servos. Typically, joint targets are generated 10 to 20 times slower than the updates to the servos. The joint trajectory between the target points is then interpolated by a polynomial function of time. The servo evaluates this function to derive the intermediate points. A primary requirement of the interpolation polynomial is that the trajectory should be as close as possible to the desired joint trajectory. A second requirement is that a joint trajectory should minimize impulsive acceleration commands to the servos.

The simplest scheme would be to use linear interpolation between successive target points. This form of interpolation can be unsatisfactory for a smooth servo response because a linear function in displacement produces impulsive accelerations between constant velocity segments. Also, the frequency at which the impulsive accelerations excite the servo must be 10 times higher (rule of thumb) than the arm structural or resonance frequency. A servo rate of approximately 50-80 Hz. is required for a typical arm with structural frequency between 5-8 Hz.

For a smooth servo response, the joint velocity and acceleration should be continuous at all points on the trajectory. The minimum order of a polynomial that satisfies the constraint of continuous joint velocity and acceleration at all points on the trajectory is a third order polynomial. Spline functions provide an elegant way of generating polynomial trajectories.

Some prior art interpolation schemes using splines for on-line trajectory generation are for a point to point joint move. A point to point joint move is one in which the robot moves from one point to another in joint coordinates. In this case, the joint trajectory can be divided into three segments, lift-off, intermediate and set-down. Three polynomials splined together describe the joint trajectory.

An on-line cubic splines interpolation method to generate trajectories is discussed in "Joint Trajectories of Mechanical Manipulators for Cartesion Path Approximation: IEEE Transactions On Systems, Man, and Cybernetics, Vol. SMC-13, No. 6, November/December 1983 by Lin et al. While the technique uses past velocities (past velocities times a fixed ratio) in determining velocities at subsequent points, there appears to be no overlap used in determining velocities at each point. In other words subsequent points are not used to recalculate the velocity determined at previous points to improve the velocity estimates and reduce the acceleration jump between points.

It is an object of the present invention to provide a robot control using cubic spline joint trajectories determined on-line, for successive joint coordinates.

It is a further object of the present invention to provide a robot control to substantially reduce error accumulation as the trajectory computation proceeds.

It is yet another object of the present invention to provide a robot control that allows feedrate changes at any time without recalculation of the spline coefficients.

SUMMARY OF THE INVENTION

In one aspect of the present invention a method of providing joint trajectories between joint space target points to achieve end effector motion of a computer controlled articulated robot manipulator is provided comprising the steps of reading three consecutive target points along the desired joint trajectory. Next, a cubic polynomial is tied between the first and second point and a quadratic polynomial is tied between the second and third point. A constraint of continuity in acceleration at the second point allows the velocity at the second point to be determined. The cubic polynomial represents a cubic spline between the first and second points. The coefficients of the cubic polynomial are provided to an interpolator as well as the time it should take to move from the first point to the second point. Position commands are periodically generated in the interpolator from the cubic polynomial coefficients, between the beginning and end points along the cubic spline connecting the first and second points. The position commands are sent to the servo control associated with a robot joint to control the robot joint motion. A fourth consecutive target point along the desired joint trajectory is read. A cubic polynomial is tied between the second and third points using the velocity previously determined at the second point and a quadratic polynomial is tied between the third and fourth points with continuity in acceleration at the third point to determine the velocity at the third point. The cubic polynomial represents a cubic spline between the second and third point. The coefficients of the cubic polynomial between the second and third points are provided to the interpolator as well as the time desired for the robot joint to move between the second and third point. Position commands are periodically generated in the interpolator from the cubic polynomial coefficients, between the beginning and end points along the cubic spline connecting the second and third point. The commanded position is sent to the control associated with the robot joint to control robot joint motion.

In another aspect of the present invention a method of providing joint trajectories between joint space target points to achieve end effector motion of a computer controlled articulated robot manipulator responsive to feedrate commands is provided. The method comprises the steps of trying a polynomial representing a spline between each consecutive pair of joint space target points using a normalized time which decreases to zero at the endpoint of each spline. The coefficients of each of the polynomials and the time desired for the robot joint to move from one joint space target point to the next are provided to an interpolator. How many times a position command can be generated along each spline in the time desired for the robot joint to move from one joint space target point to the next is determined. Next, a fractional time is determined which is the reciprocal of the number of times the position command can be generated. The fractional time is changed in direct proportion to the feedrate command and is subtracted from the remaining normalized time each time the position command is to be generated. Position commands are generated repeatedly using the gradually decreasing normalized time. The normalized time is set equal to zero when the normalized time is less than the fractional time and the final position command of each of the splines is generated using a normalized time of zero. The position commands are sent to the servo control associated with the robot joint, as they are generated, to control robot joint motion.

BRIEF DESCRIPTION OF THE DRAWING

While the specification concludes with claims particularly pointing out and distinctly claiming the present invention, the objects and advantages of the invention can be more readily ascertained from the following description of a preferred embodiment when used in conjunction with the accompanying drawing in which:

FIG. 5 is a computer program in the Pascal programming language for determining the coefficients of polynomials describing the path the robot joints are to follow;

FIG. 6 is a pseudo code computer program for generating a position and velocity command from coefficients of the polynomial describing the path to be followed.

DETAILED DESCRIPTION OF THE INVENTION

Figure 1:
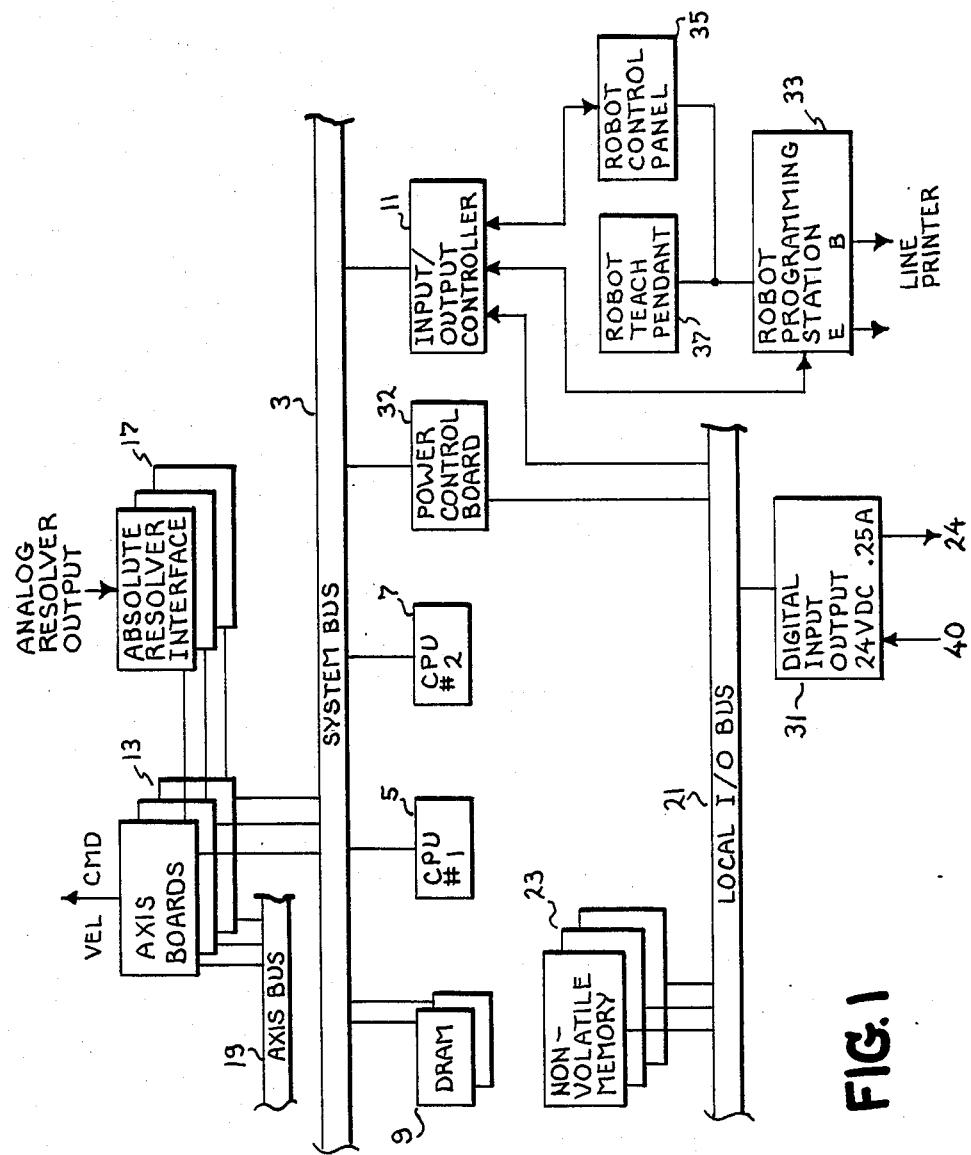
FIG. 1 is a block diagram representation of a robot controller hardware architecture.

Referring now to the drawing and particularly FIG. 1 thereof, there is shown a general purpose robot controller comprising a system bus 3, coupling a first and second central processing unit (CPU) boards 5 and 7, respectively, dynamic random access memory (DRAM) 9, an input/output controller 11 and axis boards 13. The microprocessor on each of the CPU boards can comprise Intel 8086 and 8087 microprocessors. The CPU boards coordinate the general purpose robot functions and additional logic on the first CPU board handles interrupts, performs system bus arbitration, generates a bus clock and performs on-board and subsystem diagnostics. The second CPU board serves as a coprocessor for parallel processing of real time math operations.

The axis control boards 13 provide velocity commands to servo motors in a robot manipulator (not shown). Each axis board can handle up to three axes with each axis having its own microcomputer, such as an Intel 8051 associated logic, memory and software for generating commands to the servo motors of the robot joints. A fourth microcomputer such as an Intel 8051, serves as a front-end processor preparing data for the axis microcomputers.

An absolute resolver interface bond 17 provides digital position feedback to the axis microcomputers on the axis boards from the analog resolvers (not shown) output signals. The resolvers are coupled to the robot joints to measure the joint angles in each of the axes, in each of the joints. The absolute resolver boards and the resolvers are discussed in more detail in copending application Ser. No. 659,118 filed Oct. 9, 1984, entitled "Absolute Resolver Interface" and assigned to the present assignee. Application Ser. No. 659,118 is hereby incorporated by reference. The microcomputer in the axis boards communicate with one another via an axis bus 19 which allows the microcomputers to pass data between the data random access memories associated with the microcomputers all the other axis microcomputers.

A local input/output (I/O) bus 21 couples nonvolatile memory such as bubble memory 23, a digital input/output (DIO) board 31 and the input/output controller 11. The nonvolatile memory is used for storage of all robot programs and data for which nonvolatility is a requirement. Robot programs will be loaded from the bubble memory 23 to dynamic random access memory 9 for execution, since the access time of the nonvolatile memory is too long to execute the programs from the bubble memory directly.

A power control board 32, coupled to the system bus 3 and local I/O bus 21 is used to control the logic rack power supply (not shown) using relay logic. Interface circuits are provided for end user interlocks and power control. The power control board also provides for immediate stop motion of the robot when emergency stop buttons are activated.

The input/output controller 11 couples the system bus 3 to the local I/O bus 21 and provides an interface between data external to the control and the dynamic random access memory 9. The main function of the I/O controller board is to transfer data while the first central processing unit board 5 does the data processing.

The input/output controller 11 can comprise an Intel 8088 microprocessor, ROM, RAM, system and local bus interfaces, interrupt control logic, D/A converters and three universal asynchronous receiver transmitters with baud rate generators. The input/output controller supports three serial data ports. A first port is an RS422 serial port and is coupled to a robot programming station 33 which is the primary robot system interface for creating and editing robot programs and viewing and modifying robot data. The robot programming station comprises a CRT display and an ASCII keyboard. A second serial link has a RS422 protocol and is coupled to a robot control panel 35 and a robot teach pendant 37. The robot control panel comprises pushbutton and key interlocks to control power to the robot controller, enter and exit operating modes, move the robot arm and execute robot program. The teach pendant is a hand-held unit for manual motion control of the robot arm.

Figure 2:
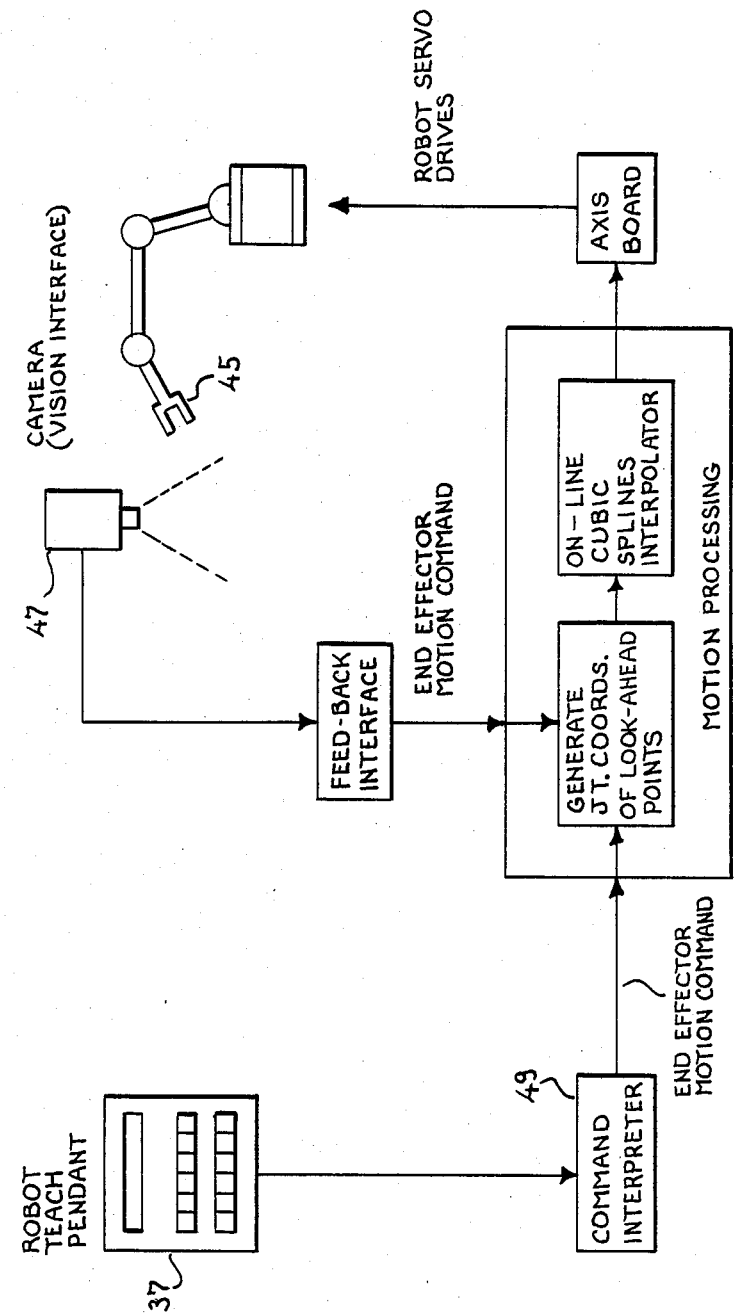
FIG. 2 is a simplified block diagram representation of a sensor-based end effector move in accordance with present invention.

Referring now to FIG. 2 a simplified block diagram of teach pendant and sensor-based end effector move is shown. Robot motion programmed by an operator is as follows. Using the teach pendant 37, the operator teaches two points $P_A$ and $P_B$ (not shown). The commanded motion is to start the robot initially from reset at $P_A$, traverse to $P_B$ with the end effector 45 moving in a straight line and then enable vision sensory feedback from a vision sensor system 47 such as General Electric's Optomation Vision System to guide the end effector motion. Based on feedback from the vision sensor system 47, the end effector begins tracking an object in space at $P_B$ moving in a piece-wise linear fashion from one linear path to another without stopping at any intermediate point. When a sensor-based end effector move is not used the end effector points can all be obtained from the teach pendant by teaching points using the teach pendant.

A command interpreter 49 which comprises program code resident in the memory of random access memory 9 of FIG. 1 and executed by the first central processing unit board 5, receives commands from the robot teach pendant 37. An end effector motion command is sent to motion processing module which comprises the first and second central processing units 5 and 7 for executing commands from the command interpreter and commands from the vision system 47. The trajectory generation is accomplished by transforming a number of points on the end effector trajectory which are in a Cartesian coordinate system with the faceplate of the robot arm given with reference to the Cartesian coordinate system at the base of the manipulator to joint space by a reverse or backward transformation which is determined by the configuration of the robot manipulator used. The reverse or backward transformation calculates a set of joint angles which correspond to each of the specified Cartesian space target points.

While the end effector intermediate target points between two points are desired to lie along a straight line, the joint trajectories determined from the end effector trajectories almost always will not lie along a straight line. Since, for most manipulators it is not possible to compute joint target points from the desired end effector trajectory at the same rate as updates in the commands to the servos are needed to assure smooth end effector motion, the joint trajectory between the target points needs to be interpolated using spline functions to generate polynomial trajectories rather than calculated exactly. In order to compute splines on-line, it is necessary to look-ahead a few points on the joint trajectory. The current point and the look-ahead points are referred to as a "block", the block size being determined by the number of points in the block. The block size must be sufficient to allow enough time for all computations required for the spline functions.

Figure 3:
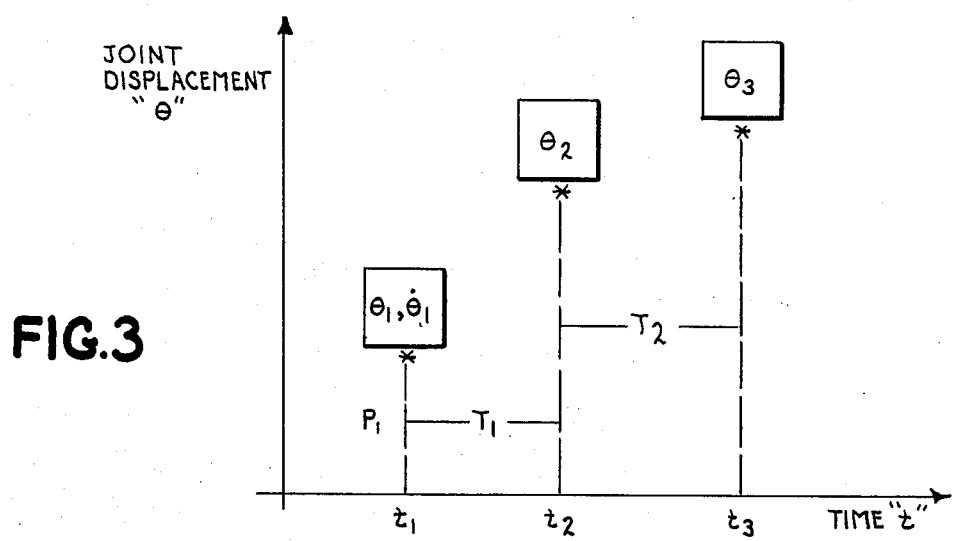
FIG. 3 is a plot of joint angle target points versus time, helpful in explaining the operation of the present invention.

FIG. 3 shows points $P_1$, $P_2$, and $P_3$ on a typical joint trajectory for one of the six joints of a robot manipulator with six degrees of freedom. Each point represents a joint angle. The points were obtained from the reverse or backward transformation of the space target points. Two polynomials with acceleration continuity at the intermediate point $P_2$ can be evaluated for the present point $P_1$ and the two look-ahead points $P_2$ and $P_3$, if one additional constraint at $P_3$ is known. At $P_1$, the position and velocity are known, at $P_2$ and $P_3$ the only information available is the position ($\theta_2$ and $\theta_3$).

By splining 2 polynomials with continuity in acceleration at $P_2$, the velocity at $P_2$ can be determined. Therefore, with 4 constraints between $P_1$ and $P_2$, a cubic polynomial for the trajectory $P_1$ to $P_2$ can be computed. The polynomial between point $P_2$ and $P_3$, however, will be a quadratic since only one boundary condition (position) is known at the point $P_3$. If an additional constraint at the point $P_3$ cannot be determined, then the overall order of the interpolating polynomial will be 2.

One way of determining an additional constraint at a block terminal point, is by the determination of the joint velocity at that point, by an "inverse velocity" computation. An inverse velocity computation is done by either computing an inverse Jacobian or by Screw theory. The data required for an inverse velocity transformation are end effector linear and rotational velocities and the configuration of the arm. The complexity of the reverse velocity transformation directly depends on the geometry of the manipulator and may be computationally too complex for on-line implementation. The method of determining the joint velocity at the intermediate point of the present invention is independent of the geometry of the manipulator and is computationally simple for real-time implementation.

The method for joint space interpolation in the preferred embodiment of the present invention employs a two point look-ahead and the velocity is estimated at every point by looking ahead one point and looking back one point. Successive blocks overlap to give an estimate of the slopes at every third point or the block terminal point. In the present invention the minimum block size is three. There is, however, no theoretical restriction on the maximum block size, which is usually limited by the computational bandwidth of the robot controller.

The slope of the curve at point $P_2$, midpoint of the three point block shown in FIG. 3, is initially estimated. Since the slope at $P_3$ is not known, the slope at $P_2$ is determined independently of the slope at $P_3$. This is done by tying together a cubic polynomial between $P_1$ and $P_2$ and a quadratic polynomial between $P_2$ and $P_3$. Thus by making acceleration continuous at $P_2$, th slope of the curve at $P_2$ is determined irrespective of the slope at $P_3$. Now when $P_4$ is known, the slope at $P_3$, determined in a similar manner as the slope at $P_2$, is used as boundary condition in fitting a cubic polynomial between points 2 and 3.

The slope at $P_3$ determined by the three point block $P_2$, $P_3$ and $P_4$, is an improvement over the one computed by differentiating the quadratic between $P_2$ and $P_3$. Note that there is no continuity in acceleration at intermediate points between the two cubic splines since the continuity in acceleration condition is used between the cubic and the quadratic polynomials but the acceleration continuity condition is not used in determining the cubic polynomial which replaces the quadratic.

While in the preferred embodiment a block size of three with an overlap of one is used, an overlap of two points could alternatively be used to increase accuracy at the expense of additional computation. In general for a block size of n (where n is greater than or equal to three) n−1 points can be overlapped. It can be proved that as the number of overlap points increases beyond three the improvement of the velocity estimation at the block end point does not increase significantly.

The equations for determining the coefficients of the cubic polynomials are derived as follows: Let $$f_1(u) = a_{31}u^3 + a_{21}u^2 + a_{11}u + a_{01} \quad (1)$$

$$f_2(u) = a_{22}u^2 + a_{12}u + a_{02} \quad (2)$$

be the equations of a cubic polynomial between $P_1$, $P_2$ and a quadratic of polynomial between $P_2$, $P_3$, respectively of FIG. 3. $f_1(u)$ and $f_2(u)$ give the position between points $P_1$ and $P_2$, and $P_2$ and $P_3$, respectively. "u" is the normalized time variable and for the ith segment is given by:

$$u = \frac{t - t_{i-1}}{t_i - t_{i-1}} = \frac{t - t_{i-1}}{T_{i-1}} \quad (3)$$

$$\frac{du}{dt} = \frac{1}{T_{i-1}} \quad (4)$$

$$\frac{d^2u}{dt^2} = 0$$

The initial conditions at $P_1$, $P_2$ and $P_3$ are shown in FIG. 3, except in this case, there is one less boundary condition at $P_3$, that is $\dot{\theta}_3$ is not known. Hence, $f_2(u)$ is given by the quadratic equation (2).

Splining equations (1) and (2) together with continuity in acceleration at $P_2$, $\dot{\theta}_2$ is determined as follows:

$$(6a_{31} + 2a_{21})/T_1^2 \mid_{u=1} = 2a_{22}/T_2^2 \mid_{u=0} \quad (6)$$

Expressing all coefficients in equations (1) and (2) in terms of $\theta_1$, $\dot{\theta}_1$, $\theta_2$, $\dot{\theta}_2$ and $\theta_3$, by using the boundary conditions, $$a_{01} = \theta_1 \quad (7)$$

$$a_{11} = \dot{\theta}_1 T_1 \quad (8)$$

$$a_{21} = 3(\theta_2 - \theta_1) - (2\dot{\theta}_1 + \dot{\theta}_2)T_1 \quad (9)$$

$$a_{31} = -2(\theta_2 - \theta_1) + (\dot{\theta}_1 + \dot{\theta}_2)T_1 \quad (10)$$

$$a_{02} = \theta_2 \quad (11)$$

$$a_{12} = \dot{\theta}_2 T_2 \quad (12)$$

$$a_{22} = (\theta_3 - \theta_2) - \dot{\theta}_2 T_2 \quad (13)$$

Substituting in equation (6), $\dot{\theta}_2$ is evaluated as follows:

$$\dot{\theta}_2 = (T_1 T_2/(2T_2 + T_1))^*[(1/T_2^2)(\theta_3 - \theta_2) + (3/T_1^2)(\theta_2 - \theta_1) - \dot{\theta}_1/T_1] \quad (14)$$

When point $P_4$ is known, $\dot{\theta}_3$ is determined by splining a cubic polynomial between $P_2$ and $P_3$ and a quadratic between $P_3$ and $P_4$.

$$\dot{\theta}_3 = (T_2 T_3/(2T_3 + T_2))[(1/T_3^2)(\theta_4 - \theta_3) + (3/T_2^2)(\theta_3 - \theta_2) - \dot{\theta}_2/T_2] \quad (15)$$

With the new value of $\dot{\theta}_3$ given by equation (15), coefficients of a cubic polynomial between $P_2$ and $P_3$ are computed instead of the original quadratic as follows:

$$a_{02} = \theta_2 \quad (16)$$

$$a_{12} = \dot{\theta}_2 T_2 \quad (17)$$

$$a_{22} = 3(\theta_3 - \theta_2) - (2\dot{\theta}_2 + \dot{\theta}_3)T_2 \quad (18)$$

$$a_{32} = -2(\theta_3 - \theta_2) + (\dot{\theta}_2 + \dot{\theta}_3)T_2 \quad (19)$$

Thus the coefficients of the cubic polynomial between $P_1$ and $P_2$ are determined from equations (7), (8), (9) and (10) with a knowledge of $\theta_1$, $\dot{\theta}_1$, $\theta_2$, $\dot{\theta}_2$ and $\theta_3$, and the coefficients of the cubic polynomial between $P_2$ and $P_3$ are determined from equations (16), (17), (18) and (19) with a knowledge of $\theta_2$, $\dot{\theta}_2$, $\theta_3$, $\dot{\theta}_3$ and $\theta_4$ (point $P_4$).

If the polynomial coefficients are determined assuming that a normalized time is equal to 1 initially and decreases to 0 as the end point is reached, then the final position will be exactly the desired position. If the normalized time is equal to 0 initially and increases to 1, the final commanded position can be slightly less than desired due to truncation errors. The effect of normalized time on truncation errors will be discussed in detail hereinafter.

The equations for determining the coefficients of the cubic polynomials for normalized time equal to 1 initially and decreasing to 0 are derived as follows: Let $$f_1(V) = b_{31}V^3 + b_{21}V^2 + b_{11}V + b_{01} \tag{21}$$

$$f_2(V) = b_{22}V^2 + b_{12}V + b_{02} \tag{22}$$

be the equations of a cubic polynomial between $P_1$ and $P_2$ and a quadratic polynomial between $P_2$ and $P_3$, respectively, of FIG. 3. "V" is the normalized time variable and for the ith segment is given by:

$$V = 1 - \frac{(t - t_{i-1})}{t_i - t_{i-1}} = -\frac{(t - t_i)}{T_{i-1}} \tag{23}$$

$$\frac{dV}{dt} = -\frac{1}{T_{i-1}} \tag{24}$$

The initial condition at $P_1$, $P_2$ and $P_3$ are shown in FIG. 3 and they are:

$$f_1(1) = \theta_1 \tag{25}$$

$$\dot{f}_1(1) = \dot{\theta}_1 \tag{26}$$

$$f_1(0) = \theta_2 \tag{27}$$

$$\dot{f}_1(0) = \dot{\theta}_2 \tag{28}$$

$$f_2(1) = \theta_2 \tag{29}$$

$$\dot{f}_2(1) = \dot{\theta}_2 \tag{30}$$

$$f_2(0) \times \theta_3 \tag{31}$$

Since the boundary condition at $P_3$ of $\dot{\theta}_3$ is not known, $f_2(V)$ is given by a quadratic equation.

Splining equations (21) and (22) together with continuity in acceleration at $P_2$, $\ddot{\theta}_2$ is determined as follows:

$$(6b_{31}V + 2b_{21})/T_1^2 \mid_{V=0} = 2b_{22}/T_2^2 \mid_{V=1}, \tag{32}$$

$$\frac{b_{21}}{T_1^2} = \frac{b_{22}}{T_2^2} \tag{33}$$

Expressing all coefficients in equations (21) and (22) in terms of $\dot{\theta}_1$, $\theta_1$, $\theta_2$, $\dot{\theta}_2$ and $\theta_3$, using the boundary condition, $$b_{01} = \theta_2 \tag{34}$$

$$b_{11} = -\dot{\theta}_2 T_1 \tag{35}$$

$$b_{21} = 3(\theta_1 - \theta_2) + (2\dot{\theta}_2 + \dot{\theta}_1)T_1 \tag{36}$$

$$b_{31} = -2(\theta_1 - \theta_2) - (\dot{\theta}_1 + \dot{\theta}_2)T_1 \tag{37}$$

$$b_{02} = \theta_3 \tag{38}$$

$$b_{12} = 2(\theta_2 - \dot{\theta}_3) + T_2\dot{\theta}_2 \tag{39}$$

$$b_{22} = (\theta_3 - \theta_2) - T_2\dot{\theta}_2 \tag{40}$$

Substituting in equation (33), $\dot{\theta}_2$ is evaluated as follows:

$$\dot{\theta}_2 = (1/(2T_2 + T_1))[(T_2/T_1)3(\theta_2 - \theta_1) + (T_1/T_2)(\theta_3 - \theta_2) - \dot{\theta}_1 T_2] \tag{41}$$

When point $P_4$ is known, $\dot{\theta}_3$ is determined by splining a cubic polynomial between $P_2$-$P_3$ and a quadratic between $P_3$ and $P_4$.

$$\dot{\theta}_3 = (1/(2T_3 + T_2))[(T_3/T_2)3(\theta_3 - \theta_2) + (T_2/T_3)(\theta_4 - \theta_3) - \dot{\theta}_2 T_3] \tag{42}$$

With the new value of $\dot{\theta}_3$ given by equation (42), coefficients of a cubic polynomial between $P_2$ and $P_3$ are computed (instead of the original quadratic) as follows:

$$b_{02} = \theta_3 \tag{43}$$

$$b_{12} = 2(\theta_2 - \theta_3) + T_2\dot{\theta}_2 \tag{44}$$

$$b_{22} = 3(\theta_2 - \theta_3) + (2\theta_2 + \dot{\theta}_3)T_2 \tag{45}$$

$$b_{32} = -2(\theta_2 - \theta_3) - (\dot{\theta}_2 + \dot{\theta}_3)T_2 \tag{46}$$

Thus, the coefficients of the cubic polynomial between $P_1$ and $P_2$ are determined from equations (34), (35), (36) and (37) with a knowledge of $\theta_1$, $\dot{\theta}_1$, $\theta_2$, $\dot{\theta}_2$ and the coefficients of the cubic polynomial between $P_2$ and $P_3$ are determined from equations (43), (44), (45) and (46) with a knowledge of $\theta_2$, $\dot{\theta}_2$, $\theta_3$, $\dot{\theta}_3$ and $\theta_4$ (point 4).

The coefficients for last two segments are determined by splining two cubic polynomials together. The end point $P_n$ has by definition a zero velocity. Let $$f_n(V) = b_{31}V^3 + b_{21}V^2 + b_{11}V + b_{01} \tag{47}$$

be the cubic polynomial for the next to the last segment and $$f_n(V) = b_{32}V^3 + b_{22}V^2 + b_{12}V + b_{01} \tag{48}$$

be the cubic polynomial for the last segment.

$$\theta_1 = \dot{\theta}_{n-2} \tag{49}$$

$$\theta_1 = \theta_{n-2} \tag{50}$$

$$\theta_2 = \theta_{n-1} \tag{51}$$

$$\theta_2 = \dot{\theta}_{n-1} \tag{52}$$

$$\theta_3 = \theta_n \tag{53}$$

$$\theta_3 = \dot{\theta}_n = 0 \tag{54}$$

$$T_1 = T_{n-1} \tag{55}$$

$$T_2 = T_n \tag{56}$$

$T_n$ is defined as the time remaining in the time to complete the move between points $P_{n-1}$ and $P_n$. $T_n$ is not equal to $T_1$ because of rounding off errors.

The coefficients for the last two segments are different since they are determined by splining two cubic polynomials with continuity in acceleration at $P_{n-1}$.

$$\dot{\theta}_2 = 1/(2T_1 * T_2(T_1 + T_2))[3(\theta_2 - \theta_1)*T_2^2 + 3(\theta_3 - \theta_2) *T_1^2 - \dot{\theta}_1 * T_1 * T_2^2] \tag{57}$$

$$b_{01} = \theta_2 \tag{58}$$

$$b_{11} = -\dot{\theta}_2 * T_1 \tag{59}$$

$$b_{21} = 3(\theta_1 - \theta_2) + (\dot{\theta}_1 + 2\dot{\theta}_2)*T_1 \tag{60}$$

$$b_{31} = 2(\theta_2 - \theta_1) - (\dot{\theta}_1 + \dot{\theta}_2)*T_1 \tag{61}$$

$$b_{02} = \theta_3 \tag{62}$$

$$b_{12} = 0 \tag{63}$$

$$b_{22} = 3(\theta_2 - \theta_3) + \dot{\theta}_2 {}^* T_2 \quad (64)$$

$$b_{32} = 2(\theta_3 - \theta_2) - \dot{\theta}_2 {}^* T_2 \quad (65)$$

Figure 4:
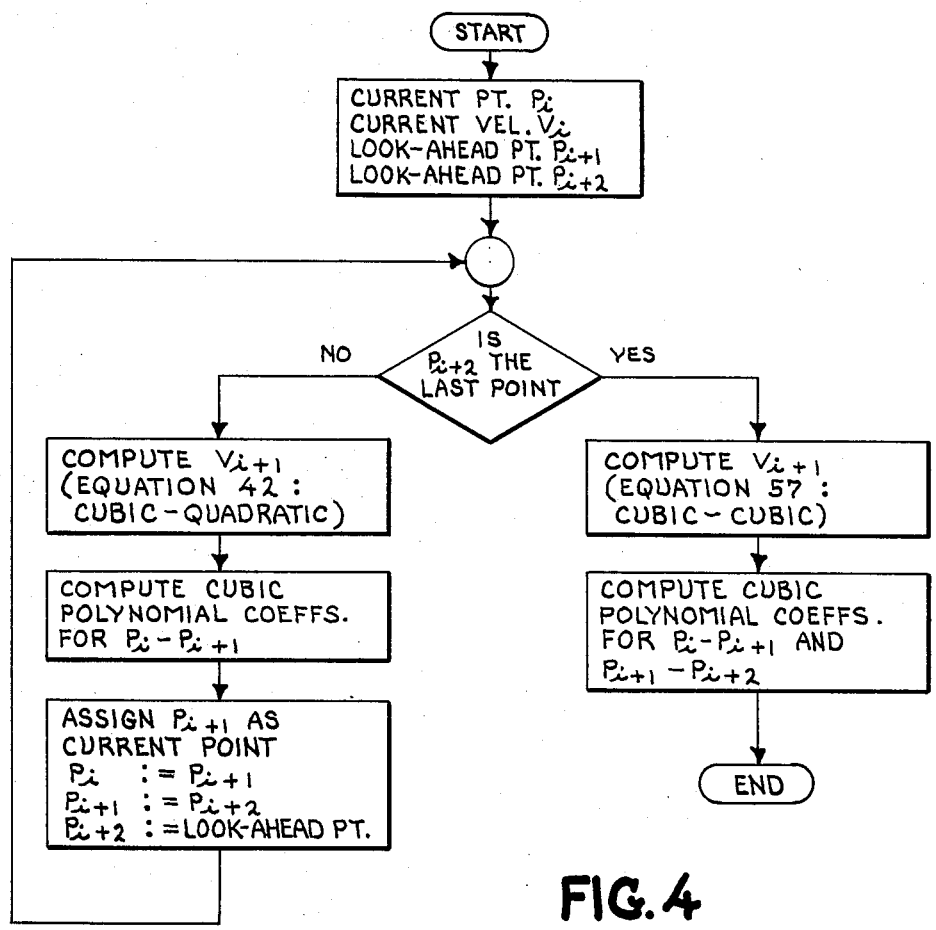
FIG. 4 is a flow chart representation of the determination of the coefficients of polynomials describing the path the robot joints are to follow.

Referring now to FIG. 4, a flow chart showing how the polynomial coefficients for the joint trajectories between a series of joint space target points is determined. The flow chart begins with the first three consecutive joint space target points $P_i$, $P_{i+1}$ and $P_{i+2}$ of a series of joint space target points and the velocity $v_i$ at point $P_i$. $P_i$ is the current point, $P_{i+1}$ is a first look-ahead point and $P_{i+2}$ is a second look-ahead point for a block size of 3. Ideally, the size of a block should be such that an error in estimation of an additional constraint at the last point of the block should be localized to the block itself. For most robot controllers, the block size is fixed by the computational bandwidth of the controller for the determination of the look-ahead points on the end effector trajectory. The points can represent the joint angles of a particular point of a robot manipulator.

A check is made in the decision block to determine whether the second look-ahead point $P_{i+2}$ is the last point in the series of joint space target points in a commanded robot manipulator move. Assuming for the moment that the last target point has not been reached, the velocity $v_{i+1}$ at point $P_{i+1}$ is determined using equation 41. The cubic polynomial coefficients for the trajectory between points $P_i$ and $P_{i+1}$ are determined. Next, three consecutive target points are set up by defining point $P_{i+1}$ as the current point, point $P_{i+2}$ as the first look ahead point and the next point in the series of joint space target points as the new second look-ahead point to overlap the next block with the current block. An initial estimate of the slope at the block end point was made by assuming the last polynomial of the block to be a quadratic. This slope is then improved by overlapping the next block with the current block. The overlap is made between a point following the block end point and the point preceding the block end point. The improved estimate of the slope at the block end point is obtained by splining two polynomials between the preceding point, block end point and the next look-ahead point with continuity in acceleration at the block end point.

The newly added look-ahead point $P_{i+2}$ is checked to see if it is the last point in the series of space target points. If point $P_{i+2}$ is not the last point, the polynomial coefficients are again determined and another look-ahead point is added to obtain a new group of three points. If point $P_{i+2}$ is the last point, the velocity $v_{i+1}$ at point $P_{i+1}$ is determined from equation 57 and the cubic polynomial coefficients are determined for the trajectory between points $P_i$, and $P_{i+1}$, and $P_{i+2}$.

A program for determining the coefficients of the cubic splines between the joint space target points represented as joint angles is shown in FIG. 5. The program is written in Pascal, a high level computer language and implements the coefficient determination shown in the flow chart of FIG. 4.

A queue containing joint space target point block information represented as six joint angles for each of the three points, whether the third point is the final trajectory point, and the time to complete the move is read by the program. The program first checks if the three points that are read from the queue are the final three points (that is, is the manipulator to stop at the last point) by checking if a flag sent with the points has been set true. Assuming for purposes of explanation that the final three points have not been passed, the program determines the velocity at the second point from equation (41) for each of the joints. Next coefficients $b_{01}$, $b_{11}$ $b_{21}$ and $b_{31}$ are determined from equations (34) to (37), respectively. An axis control block record is built containing the coefficients, the joint for which they were calculated and which set of data points the coefficients were developed for.

The next three points read from the queue comprises the next block which includes the previously received second and third point (now the first and second point) and a fourth point (now the third point). The velocity previously calculated at point 2 is now used as the velocity at point 1. The coefficients are calculated as before, after the velocity at the new point 2 is determined. Another three points are received, with previous second and third points becoming the first and second point and the new point becoming the third point and the coefficients for the cubic spline between the first and second points is determined.

When the last three points are received, detected by a flag set true, a time 1 and a time 2 are also received. Time 1 is the time for completing all segments except for the last segment. The time 2 is the time for completing the last segment and was determined by subtracting the time used for the move up to the last segment from the total time for the move. The velocity at point 2 is determined using equation (57) the coefficients for the cubic polynomial between $P_{n-2}$ and $P_{n-1}$ are determined from equations (58)–(61). The coefficients are sent and then the coefficients for the cubic equation between $P_{n-1}$ and $P_n$ are determined by equations (62)–(65). The coefficients, the joint they were calculated for, together with the fact that it is a final move are combined in an axis control block record.

Once the spline coefficients for the different joints have been determined, the coefficients are available in the axis control block record for the axis board.

The normalized time can be expressed as follows for use in the axis board:

$$V = -\frac{t - t_{i-1}}{t_i - t_{i-1}} = \frac{t_i - t}{t_i - t_{i-1}} = \frac{t_i - t}{cP} \quad (66)$$

Where t is the actual time $t_i$ is the time at the endpoint $t_{i-1}$ is the time at the starting point c is the axis cycle time (2.6 ms for example)

P is the number of c intervals between the spline points.

From the above information it is evident that something which is indicative of how much time for the spline to be completed between the two points is needed. The value chosen is 1/P referred to as the fractional time. By using the fractional time, feedrate and feedhold changes can be controlled without recomputing the spline coefficients. This is true for both position and feedforward velocity calculation.

The equations which reveal the advantages of using the fractional time are given below.

$$f_1(V) = b_{31} V^3 + b_{21} V^2 + b_{11} V + b_{01} \quad (68)$$

$$V = \frac{t_i - t}{cP} \quad (69)$$

For simplicity sake, let $t_i = cP$ and $t_{i-} = 0$ $$V = 1 - \frac{t}{cP} = 1 - \frac{t/c}{P} = 1 - \frac{n_L}{P} \qquad (70)$$

Where $n_L$ is an integer representing the nth axis cycle.

Equation (70) can be interpreted as subtracting the value $1/P$ from V each cycle period of the axis. Thus, normalized time is controlled by subtracting the fractional time $(1/P)$ each axis cycle. For example when $(1/P)$ has been subtracted twice, $n_L$ is equal to 2. This will in turn control the commanded position which is evident from equation (66). The main microcomputer calculates the fractional time by dividing the number of C time intervals in the spline into 1. This fractional time can then be multiplied by a feedrate percentage to control the actual time the move requires by proportionally adjusting the fractional time which is subtracted from normalized time. In fact, if the feedrate is set to zero (a feedhole), V does not change and thus $f_1(V)$ does not change. The change in fractional time will also properly control the feedforward velocity calculation by differentiating $f_1(V)$ with respect to time t.

$$\frac{df_1(V)}{dt} = \frac{df_1(V)}{dV} \cdot \frac{dV}{dt} = (3b_{31}V^2 + 2b_{21}V + b_{11}) \qquad (71)$$

$(1/c)(-1/P)$

The velocity $df_1(V)/dt$ is directly proportional to the value $(-1/P)$. Thus, as the fractional time is decreased, the feedforward velocity calculation will change proportionally. The polynomial is not affected. From equation (70) it is clear that the feedforward velocity computation can be controlled by controlling the fractional time.

Referring now to FIG. 6 a computer program in pseudo code is provided for providing a position command and feedforward velocity. Pseudo code, or as it is sometimes called pseudo language, is a design language which provides means for representing data and processing in a textual format. A design language has formal syntax but incorporates free form English language descriptions to explain details. Although a design language is not directly executable, automated techniques for evaluation and even conversion to code are possible.

Normalized time (V) in the equations has a range between 1 and 0. Normalized time starts at 1 and decreases by subtracting the fractional time each time the interpolator is called until it reaches 0. The reason for this backward approach is due to the fact that the truncation errors may cause the position calculation to be slightly off when $V=1$. However, when $V=0$, the calculated position will be exactly coefficient $b_{01}$. By using the backward method, the error in the commanded position at the end of the spline would be zero. Actually, the normalized time in the software is represented by a 3 byte number with a range of FFFF.FFH (where the H indicates a hexadecimal number) to 0. The spline is determined to be finished when normalized time is within a certain error of 0. This error occurs due to truncation resulting from calculating the fractional times.

The equation for calculating position is as follows:

$$\text{position} = ((A3*V) + A2)*V + A1)*V + A0 \text{ where}$$
$$V = 1 = n_L/P, A3 = b_{31}, A2 = b_{21}, A1 = b_{11}, A0 = b_{01}; \qquad (72)$$

Let $v = V *FFFF.FFH$; v is a software representation of V $$\text{position} = (((A3*v/FFFF.FFH) + A2)*v/FFFF.FFH + A1)*v/FFFF.FFH + A0.$$

Instead of dividing V by FFFF.FFH, the resultant is obtained by removing the lowest 2 bytes from V, which is the equivalent of dividing by 10000H.

The calculation of the feedforward velocity is very straightforward and easily accommodates feedhold and feedrate overrides. The equation is derived below:

$$\text{Velocity feedforward} = d(\text{position})/dt \qquad (74)$$

$$= d(\text{position})/dV * dV/dt \qquad (75)$$

$$= d(\text{position})/dv * dv/dV * dV/dn_L \qquad (76)$$

$$= d(\text{position})/dV * FFFF.FFH * -1/P \qquad (77)$$

$$= d(\text{position})/dv * -del\_v \qquad (78)$$

Where del v = time offset (software representation of fractional time)

Some calculation for velocity feedforward also exist in the position calculations, which become evident when $d(\text{position})/dv$ is written as follows:

$$d(\text{position})/dv = ((A3*v/FFFF.FFH) + 2 \\ *(A3*v/FFFF.FFH + A2))*v/FFFF.FFH + A1. \qquad (79)$$

From equation (70) normalized time (i+1) = normalized time (i) − time offset. When normalized time (V) reaches 0, the move is complete. However, with excessive truncation errors in the time offset, V reaches 0 after it is theoretically supposed to. Since normalized time is computed from the time offset, the truncation errors in calculating the time offset must be minimized to maintain accuracy in the variable, normalized time. The time offset is calculated by a divide operation followed by a truncation of all but 16 bits. Since the time offset is repeatedly subtracted from the last time, when P subtractions have taken place the normalized time has not yet reached zero, causing a lag in the axis position. This problem has been reduced by detecting when the time offset is less than or equal to 8 bits (100H). When this is detected, the time offset is shifted left by 8 bits (including 8 bits of the remainder) which will increase the accuracy and minimize the truncation error. Also, a DIV256 bit is set to signal the shift left by 8 bits i.e.

$$(DIV256 = \text{True}) = \text{time offset} = xxtt.ttH \qquad (80)$$

$$(DIV256 = \text{False}) = \text{time offset} = tttt.xxH \qquad (81)$$

where t positions indicate the 2 bytes which are sent to the axis boards and x positions indicate byte not passed and taken to be zero.

Figure 7:
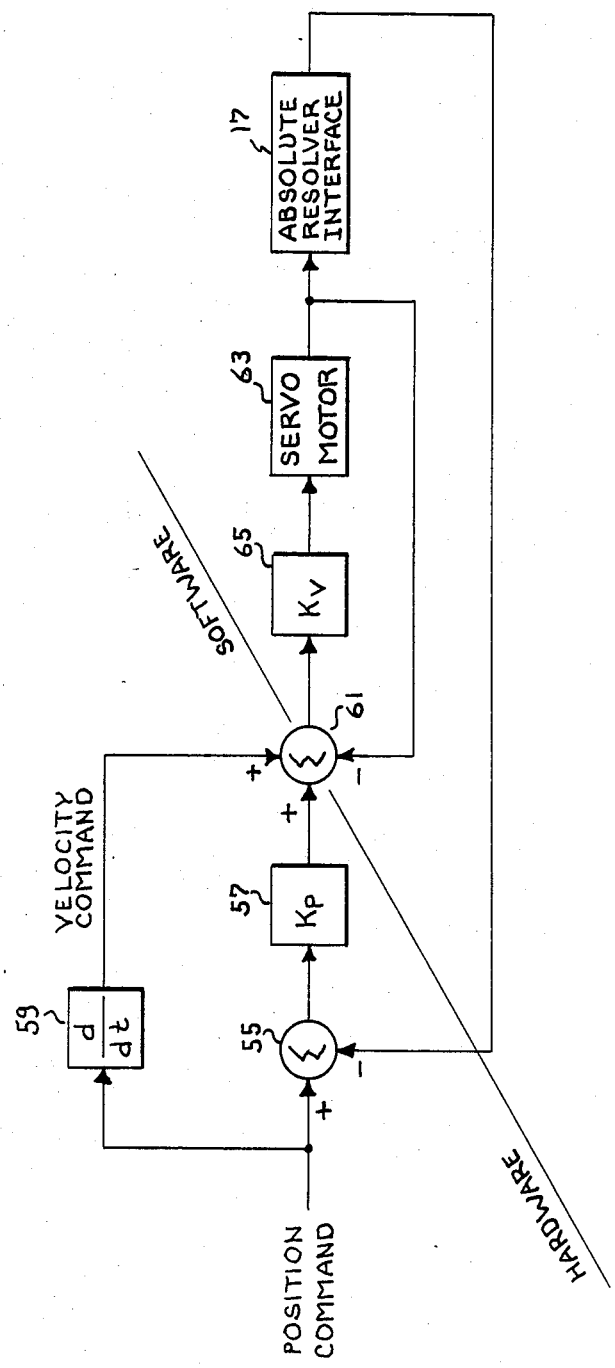
FIG. 7 is a block diagram representation of the servo control.

Referring now to FIG. 7 the servo control is shown for a single robot joint. The position command determined every time the program of FIG. 6 is run, is compared to a feedback position from the absolute resolver interface board 17 (shown in block diagram form) in summer 55. The position error signal is multiplied by a gain signal Kp in gain block 57. The velocity command shown as derived from the derivative of the position command in differentiator 59 is fed forward and summed with the amplified portion of the error signal for summer 55. The sum of the two signals from summer 61 are changed to analog signals in the preferred embodiment in a digital to analog converter not shown. The analog velocity command is compared to an analog feedback signal from the servomotor 63. The difference between the velocity command and velocity feedback signal is multiplied by a gain of Kv in gain block 65 and coupled to servo motor 63.

The foregoing describes a method of providing joint trajectories between joint space target points to achieve end effector motion of a computer controlled articulated robot manipulator using cubic spline joint trajectories determined on-line, for successive joint coordinator. The present method substantially reduces error accumulation as the trajectory computation proceeds and allows feedrate changes at any time without recalculation of the cubic spline coefficients.

While the invention has been particularly shown and described with reference to an embodiment thereof, it will be understood by those skilled in the art that various changes in the form and details may be made therein without departing from the spirit and scope of the invention.

What is claimed:

1. A method of providing joint trajectories between joint space target points to achieve end effector motion of a computer controlled articulated robot manipulator comprising the steps of:

reading three consecutive target points along the desired joint trajectory;

tying a cubic polynomial between the first and second point and a quadratic polynomial between the second and third point with continuity in acceleration at the second point, to determine the velocity at the second point, said cubic polynomial representing a cubic splint between the first and second points;

providing the coefficients of the cubic polynomial to an interpolator;

providing the time it should take for the robot joint to move from the first point to the second point, to the interpolator;

generating position commands in the interpolator periodically, between the beginning and end points along the cubic spline connecting the first and second points;

sending the position commands to the servo control associated with a robot joint to control the robot joint motion;

reading a fourth consecutive target point along the desired joint trajectory;

tying a cubic polynomial between the second and third points using the velocity previously determined at the second point and a quadratic polynomial between the third and fourth points with continuity in acceleration at the third point, to determine the velocity at the third point, said cubic polynomial representing a cubic spline between the second and third point;

providing the coefficients of the cubic polynomial between the second and third points to the interpolator;

providing the time desired for the robot joint to move between the second and third point, to the interpolator;

generating position commands in the interpolator, periodically, between the beginning and end points along the cubic spline connecting the second and third point; and sending the commanded position to the servo control associated with the robot joint to control the robot joint motion.

2. The method of claim 1, wherein the cubic polynomials are determined using a normalized time which decreases to zero at the endpoint of the spline.

3. The method of claim 2 wherein said step of determining the commanded position in the interpolator, periodically, between the beginning and end points along the cubic spline comprises the steps of:

determining how many times a position command can be generated along each spline in the time desired for the robot joint to move one joint space target to the next;

determining a fractional time which is the reciprocal of the number of times the position command can be generated;

subtracting the fractional time from the remaining normalized time each time the position command is to be generated;

generating position commands repeatedly using the gradually decreasing normalized time;

setting the normalized time equal to zero when the normalized time remaining is less than the fractional time; and generating the final position command of each of the splines using a normalized time of zero.

4. A method of providing joint trajectories between joint space target points to achieve end effector motion of a computer controlled articulated robot manipulator responsive to feedrate commands comprising the steps of:

tying a polynomial representing a spline between each consecutive pair of joint space target points using a normalized time which decreases to zero at the end point of each spline;

providing the coefficients of each of the polynomials to an interpolator;

providing the time desired for the robot joint to move from one joint space target point to the next to the interpolator;

determining how many times a position command can be generated along each spline in the time desired for the robot joint to move from one joint space target point to the next;

determining a fractional time which is the reciprocal of the number of times the position command can be generated;

changing the fractional time in direct proportional to the feedrate command;

subtracting the fractional time from the remaining normalized time each time the position command is to be generated;

generating position commands repeatedly using the gradually decreasing normalized time;

setting the normalized time equal to zero when the normalized time remaining is less than the fractional time;

generating the final position command of each of the splines using a normalized time of zero; and sending the position commands position as they are generated to the servo control associated with the robot joint, to control robot joint motion.

5. A method of providing joint trajectories between joint space target points to achieve end effector motion of a computer controlled articulated robot manipulator comprising the steps of:

reading a first block of points comprising at least three consecutive target points along the desired joint trajectory;

determining an initial estimate of the slope at the block end point by tying the next to the last point and the last point of the block with a quadratic polynomial;

reading the next block of points comprising at least three consecutive target points along the desired joint trajectory, said next block having as a first point the next to the last point of the first block, the second point of the next block is the same as the last point of the first block, whereby the two blocks overlap;

improving the estimate of the slope at the end point of the first block by splining a polynomial between the next to the last point in the first block and the second point in the next block and splining a polynomial between the second and third point in the next block, with continuity in acceleration at the first block end point;

providing the coefficients of the polynomial tying the first and second points in the next block to an interpolator;

providing the time desired for the robot joint to move from the first and second point in the next block;

generating position commands in the interpolator periodically, between the first and second point of the next block; and sending the position commands to the servo control associated with a robot joint to control the robot joint motion.

6. The method of claim 5 wherein the cubic polynomials are determined using a normalized time which decreases to zero at the endpoint of the spline.

7. The method of claim 6 wherein said step of determining the commanded position in the interpolator, periodically, between the beginning and end points along the cubic spline comprises the steps of:

determining how many times a position command can be generated along each spline in the time desired for the robot joint to move one joint space target to the next;

determining a fractional time which is the reciprocal of the number of times the position command can be generated;

subtracting the fractional time from the remaining normalized time each time the position command is to be generated;

generating position commands repeatedly using the gradually decreasing normalized time;

setting the normalized time equal to zero when the normalized time remaining is less than the fractional time; and generating the final position command of each of the splines using a normalized time of zero.

* * * * *